United States Patent [19]

Dubner

[11] Patent Number: 5,593,790
[45] Date of Patent: Jan. 14, 1997

[54] INTERFERENCE SUPER-RESOLUTION USING TWO MAGNETIC LAYER CONSTRUCTION

[75] Inventor: Andrew D. Dubner, St. Paul, Minn.

[73] Assignee: Imation Corp., St. Paul, Minn.

[21] Appl. No.: 365,911

[22] Filed: Dec. 29, 1994

[51] Int. Cl.[6] .................................................. G11B 5/66
[52] U.S. Cl. ........................... 428/694 ML; 428/64.3; 428/336; 428/694 SC; 428/694 DE; 428/694 RE; 428/694 RL; 428/694 MM; 428/694 EC; 428/694 NF; 428/900; 369/13; 369/283; 369/286; 360/59; 360/114
[58] Field of Search .................... 428/694 ML, 694 SC, 428/694 DE, 694 RE, 694 RL, 694 MM, 694 EC, 694 NF, 900, 64.3, 336; 369/13, 283, 286; 360/59, 114

[56] References Cited

U.S. PATENT DOCUMENTS

| | | | |
|---|---|---|---|
| 4,871,614 | 10/1989 | Kobayashi | 428/336 |
| 5,018,119 | 5/1991 | Aratani et al. | 369/13 |
| 5,265,074 | 11/1993 | Ohta et al. | 369/13 |

FOREIGN PATENT DOCUMENTS

| | | | |
|---|---|---|---|
| 0416656A2 | 3/1991 | European Pat. Off. | |
| 0420587 | 4/1991 | European Pat. Off. | G11B 11/10 |
| 0586175A1 | 3/1994 | European Pat. Off. | |
| 0586122A1 | 3/1994 | European Pat. Off. | |
| 63200343 | 8/1989 | Japan | |

OTHER PUBLICATIONS

"Multilayered Magneto–Optical Disks for Magnetically Induced Superresolution," Kaneko et al., *Jpn. J. Appl. Phys.*, vol. 31 (1992), pp. 568–575.

*Primary Examiner*—Leszek Kiliman
*Attorney, Agent, or Firm*—Eric D. Levinson

[57] ABSTRACT

A magneto-optic recording medium having two magneto-optic layers exchange-coupled to each other. The Curie temperature, $T_{C1}$, of the first layer is less than that of the second layer, $T_{C2}$. The magneto-optic effect is large for temperatures, T, less than $T_{C1}$, but the thicknesses of the two layers are selected so that they optically interfere to result in zero magneto-optic rotation at temperatures between $T_{C1}$ and $T_{C2}$. The medium is designed so that a laser beam detects a signal only at the front of the beam spot and not at the rear of the spot, allowing a drive system to read/write smaller bits on the medium, thereby increasing the storage capacity of the medium.

23 Claims, 3 Drawing Sheets

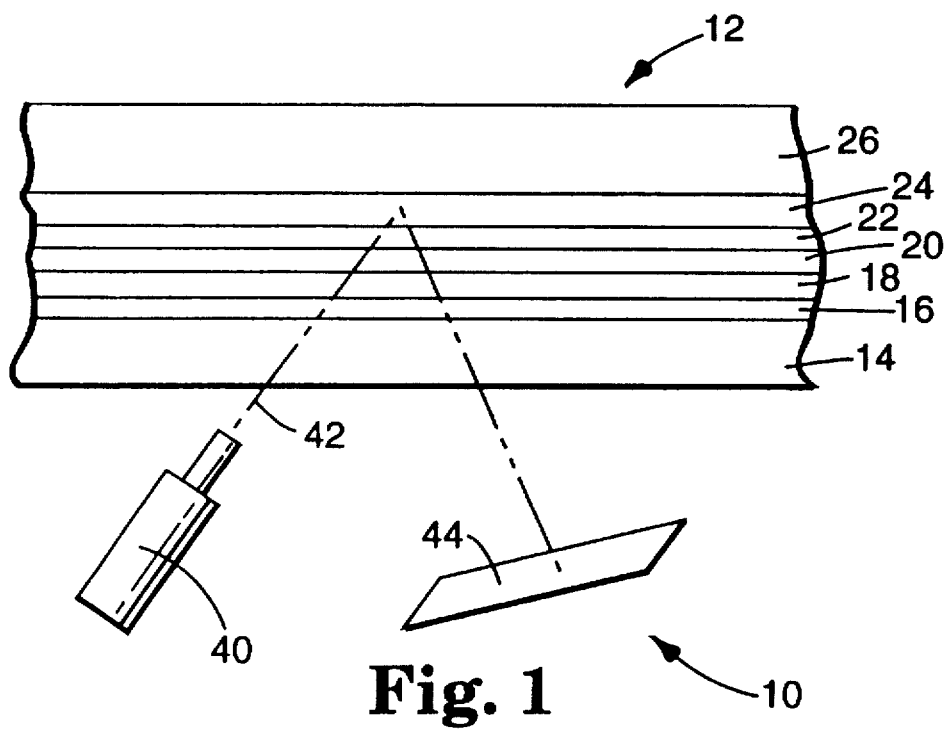
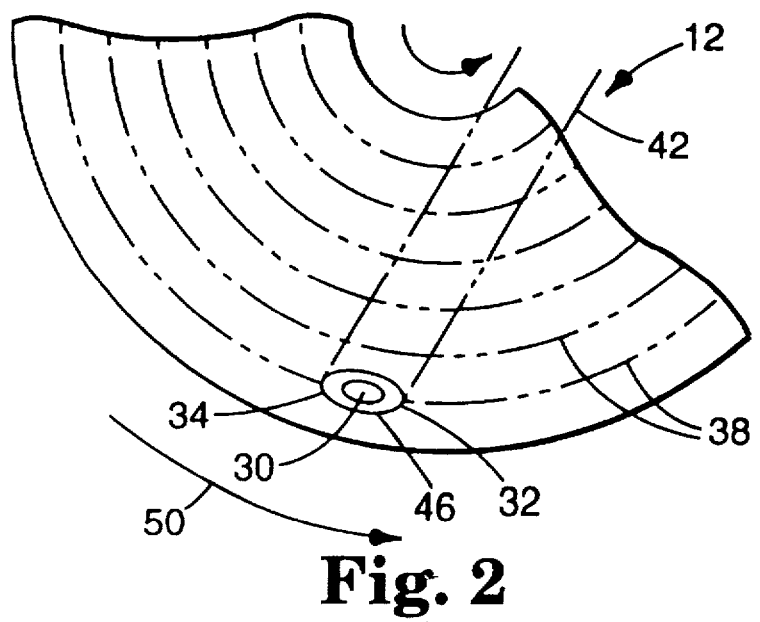

INTERFERENCE SUPER-RESOLUTION USING TWO MAGNETIC LAYER CONSTRUCTION

FIELD OF THE INVENTION

The invention relates generally to the field of magneto-optic recording, and more specifically to higher storage capacity magneto-optic media.

BACKGROUND OF THE INVENTION

In magneto-optic recording, data is represented by a magnetized domain, which is a stable magnetizable region having a preferential magnetized orientation. The preferentially magnetized domain is often referred to as a "bit." The preferential magnetized orientation is caused by an energy source, such as a laser, of sufficient intensity heating the medium above its Curie temperature while the medium is simultaneously biased by a magnetic field. The laser is used to heat the magnetic medium in the localized area. When the localized area exceeds the Curie temperature, the magnetization direction is set by the magnetic field.

When the laser beam is removed, the bit cools in the presence of the biasing magnetic field and has its magnetization switched to that direction. The momentary temperature rise in the bit reduces the bit's coercive force so that the magnetic biasing field forces the magnetization of the domain to conform to the direction of the biasing magnetic field as the bit cools below its Curie temperature.

The never-ending tendency in magneto-optic recording is toward higher storage capacities. However, the amount of information that can be stored on a magneto-optic disc is limited by the degree to which the size of a focused laser beam spot can be decreased. One method of reducing the effective area of the laser beam spot is to take advantage of the fact that when a laser is focused to a spot on a moving medium, the temperature of the medium under the spot will not be uniform. If the medium is comprised of a material having a transition temperature within the range of temperatures generated in the medium under the spot, it is possible to erase data recorded in one portion of the spot while reading information in another portion. More specifically, data is erased from a readout layer in the medium at a higher temperature (i.e., at the rear of the beam spot) while subjecting that portion of the medium to an external magnetic field, and data is read from the read out layer at a lower temperature (i.e., at the front of the beam spot).

SUMMARY OF THE INVENTION

Accordingly, the present invention includes a magneto-optic (MO) recording medium including two MO layers exchange-coupled to each other, wherein the Curie temperature of the second layer, $T_{C2}$, is greater than that of the first layer, $T_{C1}$. The MO effect is large for temperatures, T, less than $T_{C1}$ but the thicknesses of the two layers are selected so that they optically interfere to result in zero magneto-optic rotation at temperatures between $T_{C1}$ and $T_{C2}$. Thus super-resolution is achieved because the beam detects a signal only at the front of the beam spot, where $T<T_{C1}$, and not at the rear of the beam spot, where $T_{C1}<T<T_{C2}$. The difference in the Curie temperatures between the two layers, $T_{C2}-T_{C1}$, is preferably greater than 40° C., and more preferably greater than 70° C.

The MO layers are preferably terbium-iron-cobalt (Tb-Fe-Co), and the first layer preferably comprises less than 5% Co while the second layer has more than 5% Co. The difference in thickness between the two layers is preferably between 10 and 20 nm. The thickness of the first layer is preferably between 20 and 40 nm and the second layer is between 15 and 25 nm.

The MO layers are preferably provided on a dielectric layer, e.g., silicon nitride. A second dielectric layer is preferably provided on the other side of the MO layers. A reflective layer is preferably provided over the second dielectric layer.

The present invention also includes a method of reading an MO recording medium including the steps of providing an MO recording medium have two exchange-coupled MO layers; directing a laser beam toward the medium so that the laser beam heats a spot on the medium; and moving (e.g., rotating) the medium with respect to the laser, wherein the medium is heated to a first temperature, $T_1$, at the front of the spot, and a second temperature, $T_2$, at the rear of the spot, wherein $T_1<T_{C1}<T_2<T_{C2}$.

The present invention also includes an MO recording system for accomplishing the method described above.

BRIEF DESCRIPTION OF THE DRAWING

FIG. 1 is a schematic side view of an MO recording system according to the present invention.

FIG. 2 is a schematic overhead perspective view of an MO medium according to one embodiment of the present invention.

DETAILED DESCRIPTION

Figure 3:
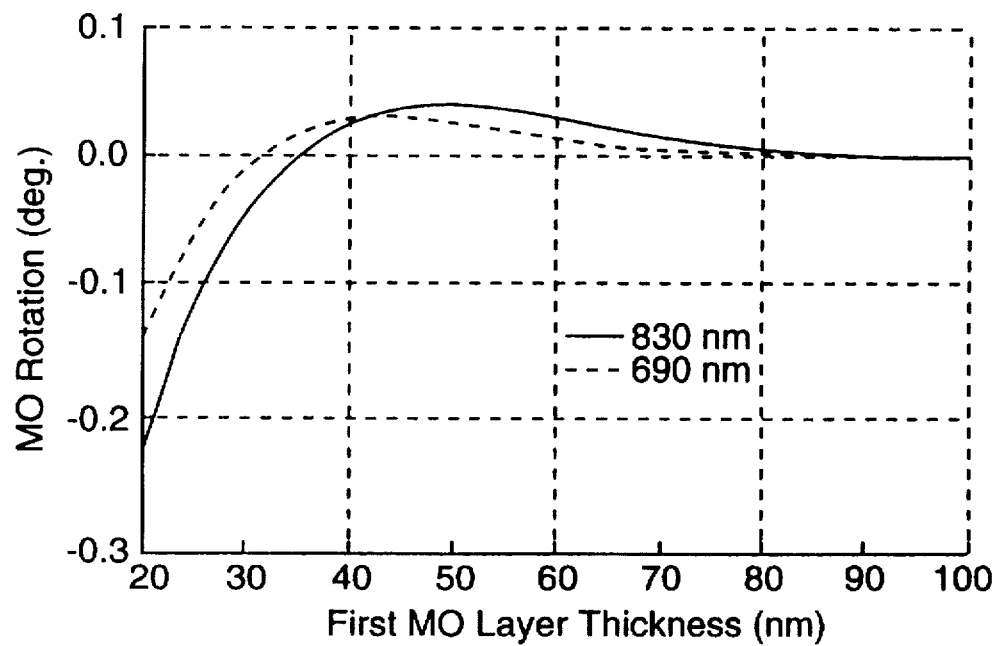
FIG. 3 is a graph based on optical modeling of MO rotation as a function of the thickness of the first MO layer.

A schematic side view of an MO recording system according to the present invention is shown in FIG. 1. System 10 is comprised of MO recording medium 12, laser 40, and detector 44.

Medium 12 is comprised of substrate 14, first dielectric layer 16, first MO recording layer 18, second MO recording layer 20, second dielectric layer 22, reflecting layer 24, and protective layer 26. Laser 40 emits a beam 42 that enters substrate 14, passes through MO layers 18 and 20, is reflected by reflecting layer 24, and passes back through medium 12, exits the substrate, and is sensed by detector 44.

First MO layer 18 has a Curie temperature, $T_{C1}$, lower than that of second MO layer 20, $T_{C2}$. At a temperature, T, above $T_{C1}$ but below $T_{C2}$, first MO layer 18 becomes non-magnetic and no longer produces the magneto-optic effect. The thicknesses of the two MO layers 18 and 20 are selected so that the MO effect is large when the two layers are magnetic and zero when the first MO layer is non-magnetic, i.e., at $T>T_{C1}$. This is accomplished by selecting the thicknesses of the two MO layers 18 and 20 so that they optically interfere to result in zero net MO rotation, i.e., the phase difference between the right-handed and left-handed circularly polarized light is tuned to zero so that the light interferes with itself upon reflection to give zero MO rotation.

A schematic overhead perspective view of medium 12 in the form of a disk is shown in FIG. 2. Medium 12 has a plurality of concentric or spiral tracks 38 comprised of recorded bits 30. Laser beam 42 forms a spot 46 on the surface of medium 12. The diameter of spot 46 is preferably about twice the length of each bit 30.

Medium 12 is rotated in the direction of arrow 50 by a mechanism (not shown) within system 10. As medium 12 moves with respect to beam spot 46, the front 32 of the beam spot is heated to a first temperature, $T_1$, which is less than $T_{C1}$. The rear 34 of spot 46, however, by virtue of having been subjected to laser beam 42 for a longer period of time than the front 32 of the spot, is heated to a second temperature, $T_2$, which is higher than $T_1$ and which is also higher than $T_{C1}$, but less than $T_{C2}$. This ensures that detector 44 only detects an MO rotation from the front 32 of spot 30 and not from the rear 34 of the spot, since the MO rotation at the rear of the beam is zero for temperatures between $T_{C1}$ and $T_{C2}$.

The present invention has the following advantages over conventional recording systems. First, as in other systems using super-resolution, the linear density of recorded bits on the medium is increased. Second, the present invention does not require the use of an external magnet during readback of data from the medium, thereby decreasing the amount of power used by the system during readback. Third, the present invention reduces the cost and complexity of constructing the medium by requiting the deposition of only two magneto-optic layers, instead of three.

The Curie temperatures of MO layers 18 and 20 preferably differ by at least 40° C., and more preferably at least 70° C. $T_{C1}$ is preferably within the range of from about 80° to 180° C., and $T_{C2}$ is preferably within the range of from about 200° to 300° C.

Preferred MO materials for MO layers 18 and 20 include Tb-Fe-Co. The Cure temperatures of MO layers 18 and 20 may be varied by changing the amount of cobalt present in the alloy. The amount of cobalt in first MO layer 18 is preferably less than 5% of the Tb-Fe-Co to achieve $T_{C1}$, while second MO layer 20 preferably comprises greater than 5% Co to achieve $T_{C2}$.

The thicknesses of MO layers 18 and 20 must be selected so that when layer 18 is non-magnetic, the Kerr rotation of light exiting the stack is minimized (preferably about 0°). (Of course, layer 18 must not be so thick that none of the light from laser 40 is transmitted to layer 20.) The optical stack is tuned so that the ratio of the magneto-optic rotations when first MO recording layer 18 is magnetized versus when it is not magnetized is at least 5:1, and preferably about 30:1.

In one preferred embodiment, first MO layer 18 comprised of $Tb_{0.20}Fe_{0.79}Co_{0.01}$ ($T_{C1}$=160° C.) and is about 20 to 40 nm thick, and second MO layer 20 is comprised of $Tb_{0.19}Fe_{0.73}Co_{0.08}$ ($T_{C2}$=240° C.) and is about 15 to 25 nm thick.

Substrate 14 is preferably transparent, has very low birefringence, and is nominally 1.2 mm thick. Suitable materials include glass, polycarbonate, polymethylmethacrylate, and amorphous polyolefin (APO).

Dielectric layers 16 and 22 preferably comprise a dielectric material such as yttrium oxide, aluminum oxide, silicon carbide, silicon nitride, or silicon dioxide, although other known dielectric materials may be used. Dielectric layers 16 and 22 typically have thicknesses within the range of 5 to 100 nm.

Reflecting layer 24 typically comprises a highly reflective metal such as aluminum, gold, silver, or some alloy thereof. Reflecting layer 24 typically ranges from about 20 to 100 nm thick. Protective layer 26 is deposited on reflecting layer 24 to additionally protect the thin film materials in the MO layers from reacting with elements in the surrounding environment. Protective layer 26 preferably comprises a photocurable polymer with a thickness of greater than 3 mm.

Optical modeling suggests that there is an optimum thickness of first MO layer 18 which results in zero MO rotation upon reflection from both MO layers. FIG. 3 is a plot of the MO rotation as a function of the thickness of first MO layer 18, assuming that the thickness of second MO layer 20 is held constant at 20 nm. Light having wavelengths of 690 and 830 nm was modeled. At a thickness of 30 to 40 nm, the light interferes with itself upon reflection to give zero MO rotation. As the wavelength of the light is decreased, the optimum thickness decreases. If first MO layer 18 is greater than 75 nm thick, the MO rotation tends toward zero because the light is being completely absorbed in the first layer.

The invention will now be further illustrated by the following non-limiting Example. (All measurements are approximate.)

EXAMPLE

An MO disk having the following construction was fabricated: Substrate 14 comprised polycarbonate having a thickness of 1.2 mm. First dielectric layer 16 comprised silicon nitride and was 80 nm thick. First MO layer 18 comprised $Tb_{0.20}Fe_{0.79}Co_{0.01}$, with $T_{C1}$=160° C., and was 34 nm thick. Second MO layer 20 comprised $Tb_{0.192}Fe_{0.725}Co_{0.083}$ with $T_{C2}$=240° C., and was 20 nm thick. Second dielectric layer 22 comprised silicon nitride and was 10 nm thick. Reflecting layer 24 comprised an aluminum chromium (Al—Cr) alloy having about 4% by weight (2% atomic) chromium and was about 20 nm thick. Second MO layer 20 comprised $Tb_{0.192}Fe_{0.725}Co_{0.083}$ with $T_{C2}$240° C., and was 20 nm thick.

Figure 4:
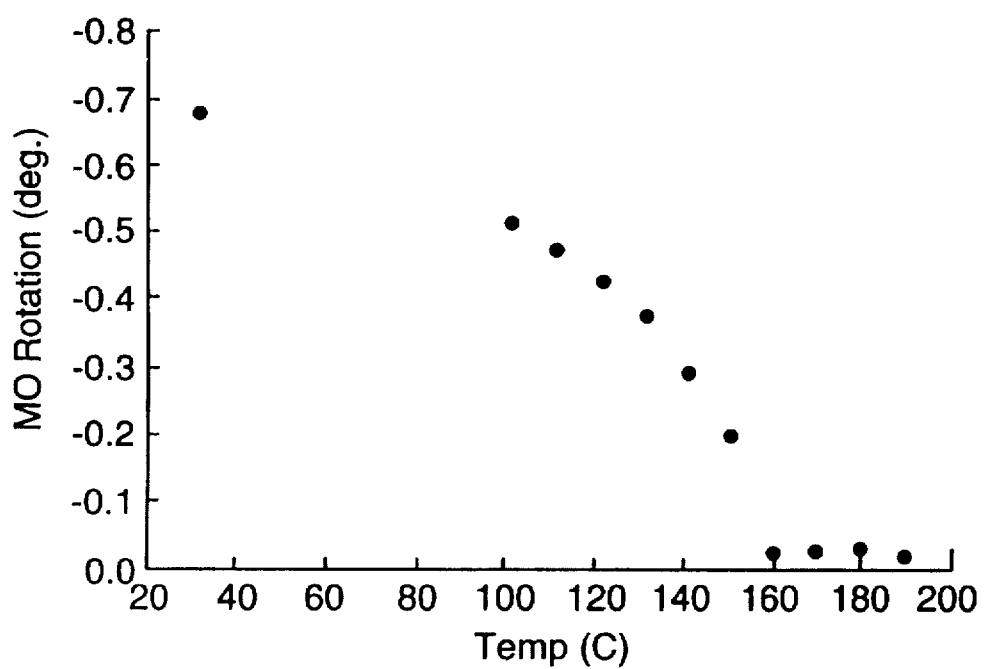
FIG. 4 is a plot of MO rotation as a function of temperature in degrees celsius.
Figure 5:
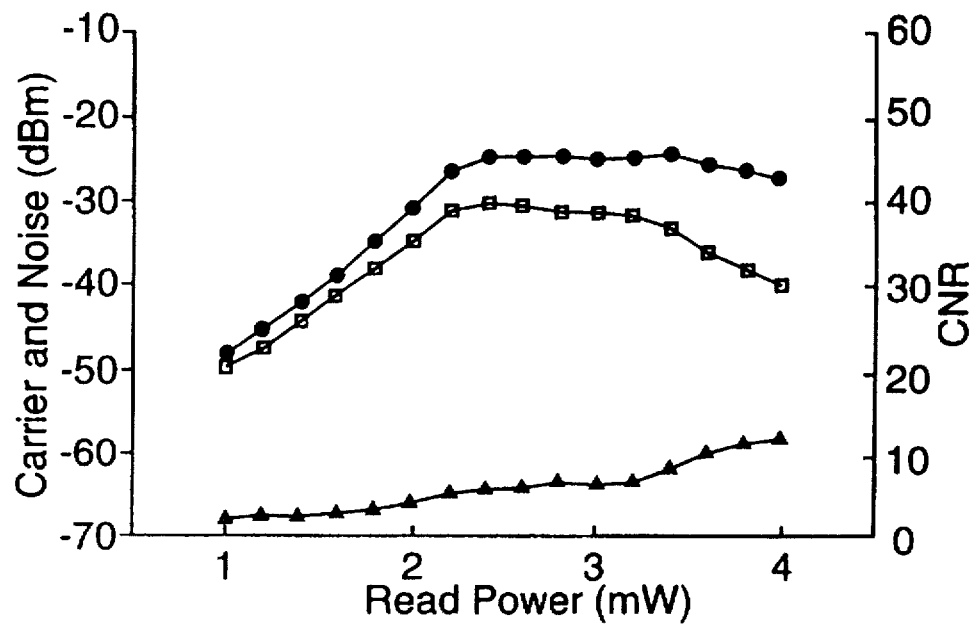
FIG. 5 is a plot of Carder and Noise, as well as the carder-to-noise ratio (CNR) as a function of the read power of a laser.

The magneto-optical rotation of the disk was measured as a function of temperature using a Kerr Hysteresis loop at 830 nm. As shown in FIG. 4, the MO rotation was non-zero for temperatures below 160° C., the Curie temperature of the first MO layer, and became zero at 160° C. However, measurements of the magnetization of the optical stack indicated that it still had a significant magnetic moment at temperatures above 160° C. FIG. 5 shows a plot of the carder level (circles) and noise level (triangles) as a function of readback laser power. These measurements were made using a drive tester having an 830 nm laser. The carrier to noise ratio CNR (open squares) is shown on the right-hand axis. The written signal was formed using a flying magnetic head modulating at 6 MHz. The linear velocity was 5.65 m/s and the resulting marks were 0.47 mm. The signal level at 1.0 mW read power can be considered the conventional readback technique where the medium is not heated above $T_{C1}$. As the read power is increased, the signal level increases due to the increased resolution, reaching a maximum at 2.4 mW.

Figure 6:
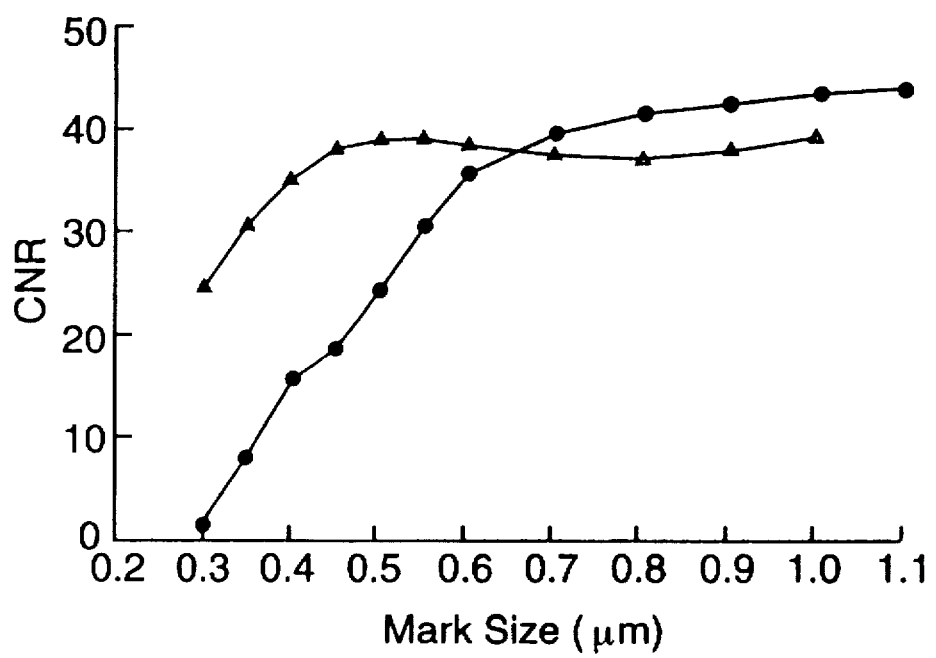
FIG. 6 is a plot of CNR as a function of mark size in μm.

FIG. 6 shows a plot of CNR versus the written mark size for both the conventional readback technique (circles) and the technique of the present invention (triangles). Below a mark size of 0.6 μm, the present invention gives higher CNR. Thus, a higher data density can be achieved using the present invention.

I claim:

1. A magneto-optic super-resolution recording medium, comprising, in order:

a substrate;

a first magneto-optic layer, having a first thickness, $t_1$, and a first Curie temperature, $T_{C1}$; and a second magneto-optic layer exchange-coupled to the first magneto-optic layer, having a second thickness, $t_2$, and a second Curie temperature, $T_{C2}$, wherein $T_{C2} > T_{C1}$;

wherein the two magneto-optic layers exhibit a non-zero net magneto-optic rotation for temperatures, T, $< T_{C1}$, and wherein $t_1$ and $t_2$ are such that the first and second magneto-optic layers optically interfere to result in substantially zero net magneto-optic rotation at $T_{C1} < T < T_{C2}$, wherein super-resolution is achieved by a laser beam which detects a signal only at a front of a beam spot on the medium, where $T < T_{C1}$, and not at the rear of the beam spot, where $T_{C1} < T < T_{C2}$.

2. The medium of claim 1, wherein $T_{C2} - T_{C1} > 40°$ C.

3. The medium of claim 1, wherein $T_{C2} - T_{C1} > 70°$ C.

4. The medium of claim 1, wherein the magneto-optic layers comprise terbium-iron-cobalt.

5. The medium of claim 1, further comprising a dielectric layer provided between the substrate and the first magneto-optic layer.

6. The medium of claim 4, wherein the first layer comprises less than 5% cobalt and the second layer comprises more than 5% cobalt.

7. The medium of claim 5, wherein the dielectric layer comprises silicon nitride.

8. The medium of claim 5, further comprising a second dielectric layer provided on the second magneto-optic layer on the side opposite the substrate.

9. The medium of claim 6, wherein 10 nm $< t_1 - t_2 <$ 20 nm.

10. The medium of claim 6, wherein 20 nm $< t_1 <$ 40 nm and 15 nm $< t_2 <$ 25 nm.

11. The medium of claim 8, further comprising a reflective layer provided on the second dielectric layer on the side opposite the substrate.

12. A method of reading a magneto-optic recording medium using super-resolution, comprising the steps of:

providing a magneto-optic recording medium comprising, in order, a substrate, a first magneto-optic recording layer having a first Curie temperature, $T_{C1}$, and a first thickness, $t_1$, and a second magneto-optic recording layer exchanged-coupled to the first recording layer, having a second Curie temperature, $T_{C2}$, and a second thickness, $t_2$, wherein $T_{C2} > T_{C1}$, and wherein the two magneto-optic layers exhibit a non-zero net magneto-optic rotation for temperatures, T, $< T_{C1}$, and wherein $t_1$ and $t_2$ are such that the two magneto-optic layers optically interfere to result in substantially zero net magneto-optic rotation at $T_{C1} < T < T_{C2}$;

directing a laser beam toward the substrate-side of the medium so that the laser beam heats a spot on the medium; and moving the medium with respect to the laser spot, wherein the medium is heated to a first temperature, $T_1$, at the front of the laser spot, and a second temperature, $T_2$, at the rear of the laser spot, wherein $T_1 < T_{C1} < T_2 < T_{C2}$;

wherein super-resolution is achieved because the laser beam detects a signal only at the front of the laser spot and not at the rear of the laser spot.

13. The method of claim 12, wherein $T_{C2} - T_{C1} > 40°$ C.

14. The method of claim 12, wherein $T_{C2} - T_{C1} > 70°$ C.

15. The medium of claim 12, wherein the magneto-optic layers comprise terbium-iron-cobalt and the first magneto-optic layer comprises less than 5% cobalt and the second magneto-optic layer comprises more than 5% cobalt.

16. The method of claim 15, wherein 10 nm $< t_1 - t_2 <$ 20 nm.

17. The method of claim 16, wherein 20 nm $< t_1 <$ 40 nm and 15 nm $< t_2 <$ 25 nm.

18. A magneto-optic recording system using super-resolution, comprising:

a magneto-optic recording medium comprising a first magneto-optic layer having a first Curie temperature, $T_{C1}$, and a first thickness, $t_1$, and a second magneto-optic layer exchange-coupled to the first magneto-optic layer, having a second Curie temperature, $T_{C2}$ and a second thickness, $t_2$, wherein $T_{C2} > T_{C1}$, and wherein the two magneto-optic layers exhibit a non-zero net magneto-optic rotation for temperatures, T, $< T_{C1}$, and wherein $t_1$ and $t_2$ are such that the two magneto-optic layers optically interfere to result in substantially zero net magneto-optic rotation at $T_{C1} < T < T_{C2}$;

a laser beam directed toward the substrate-side of the medium so that the laser beam heats a spot on the medium; and means for moving the medium with respect to the laser spot so that the medium is heated to a first temperature, $T_1$, at the front of the laser spot, and a second temperature, $T_2$, at the rear of the spot, wherein $T_1 < T_{C1} < T_2 < T_{C2}$;

wherein super-resolution is achieved because the laser beam detects a signal only at the front of the laser spot and not at the rear of the laser spot.

19. The system of claim 18, wherein $T_{C2} - T_{C1} > 40°$ C.

20. The system of claim 18, wherein $T_{C2} - T_{C1} > 70°$ C.

21. The system of claim 18, wherein the magneto-optic layers comprise terbium-iron-cobalt, and wherein the first magneto-optic layer comprises less than 5% cobalt and the second magneto-optic layer comprises more than 5% cobalt.

22. The system of claim 21, wherein 10 nm $< t_1 - t_2 <$ 20 nm.

23. The system of claim 21, wherein 20 nm $< t_1 <$ 40 nm and 15 nm $< t_2 <$ 25 nm.

* * * * *

UNITED STATES PATENT AND TRADEMARK OFFICE
CERTIFICATE OF CORRECTION

PATENT NO.: 5,593,790
DATED: January 14, 1997
INVENTOR(S): Dubner

It is certified that error appears in the above-identified patent and that said Letters Patent is hereby corrected as shown below:

Col. 2, line 37, "Carder" should be --Carrier--.

Col. 2, line 38, "carder" should be --carrier--.

Col. 3, line 30, "requiting" should be --requiring--.

Col. 4, line 35, "thick" should be --thick.--.

Col. 4, line 42, "$T_{C2}240°$ C." should be --$T_{C2}=240$ C.--.

Col. 4, line 50, "carder" should be --carrier--.

Signed and Sealed this

Fifteenth Day of July, 1997

*Attest:*

BRUCE LEHMAN

*Attesting Officer*   Commissioner of Patents and Trademarks